(12) United States Patent
MacKelvie

(10) Patent No.: US 9,448,011 B2
(45) Date of Patent: Sep. 20, 2016

(54) COMPOSITE PIPE HEAT EXCHANGER FOR DRAINWATER HEAT RECOVERY

(71) Applicant: Winston MacKelvie, Knowlton (CA)

(72) Inventor: Winston MacKelvie, Knowlton (CA)

( * ) Notice: Subject to any disclaimer, the term of this patent is extended or adjusted under 35 U.S.C. 154(b) by 247 days.

(21) Appl. No.: 13/986,582

(22) Filed: May 16, 2013

(65) Prior Publication Data

US 2013/0306289 A1    Nov. 21, 2013

Related U.S. Application Data

(60) Provisional application No. 61/688,532, filed on May 16, 2012.

(51) Int. Cl.
| | | |
|---|---|---|
| F28F 21/00 | (2006.01) | |
| F28F 1/00 | (2006.01) | |
| F28F 21/06 | (2006.01) | |
| F28F 21/08 | (2006.01) | |
| F28D 7/10 | (2006.01) | |
| F28D 21/00 | (2006.01) | |
| E03C 1/00 | (2006.01) | |

(52) U.S. Cl.
CPC .............. *F28F 1/00* (2013.01); *F28D 7/106* (2013.01); *F28D 21/0012* (2013.01); *F28F 1/003* (2013.01); *F28F 21/062* (2013.01); *F28F 21/085* (2013.01); *E03C 2001/005* (2013.01); *F24D 2200/20* (2013.01); *Y02B 30/566* (2013.01)

(58) Field of Classification Search
CPC .............. E03B 7/12; E03B 7/14; F02F 1/06; F02F 1/08; E03C 1/00; E03C 2001/005; F28D 21/0012; F28D 7/0008; Y02B 30/566

USPC .......... 165/180, 185–186, 154, 169; 138/38, 138/114, 161; 29/890.034, 890.036, 29/890.053

See application file for complete search history.

(56) References Cited

U.S. PATENT DOCUMENTS

| | | | | |
|---|---|---|---|---|
| 2,773,513 A | * | 12/1956 | Isenberg | 138/111 |
| 3,014,827 A | * | 12/1961 | Clinchy | F16L 59/024 138/161 |
| 3,339,260 A | * | 9/1967 | Burne et al. | 29/890.036 |
| 4,334,142 A | * | 6/1982 | Blackmore | 392/469 |
| 4,497,365 A | * | 2/1985 | Boyer | 165/164 |
| 5,385,299 A | * | 1/1995 | Zawada | F24B 5/021 126/110 R |
| 5,857,515 A | * | 1/1999 | Skupien | 165/47 |
| 6,311,730 B2 | * | 11/2001 | Penza | 138/114 |
| 6,595,241 B2 | * | 7/2003 | Chen | 138/38 |
| 2010/0132403 A1 | * | 6/2010 | MacKelvie | 62/515 |
| 2011/0297360 A1 | * | 12/2011 | Perry | F16L 53/00 165/185 |

FOREIGN PATENT DOCUMENTS

| | | | | |
|---|---|---|---|---|
| GB | 778679 A | * | 7/1957 | F28F 1/40 |
| GB | 823799 A | * | 11/1959 | F16L 59/023 |

* cited by examiner

*Primary Examiner* — Judy Swann
*Assistant Examiner* — Jose O Class-Quinones

(57) ABSTRACT

A low cost hybrid horizontal drainpipe heat exchanger using a mixture of plastic and copper to reduce cost, the heat exchanger including a conduit which has upper and lower tube segments sealed together along respective longitudinal edges so as to create a tube or a pipe wherein the lower segment is thermally conductive and the upper segment is thermally insulative, the arrangement being such that any drainwater flowing through the drainpipe will flow interiorly on the lower segment for heat exchange purposes.

6 Claims, 1 Drawing Sheet

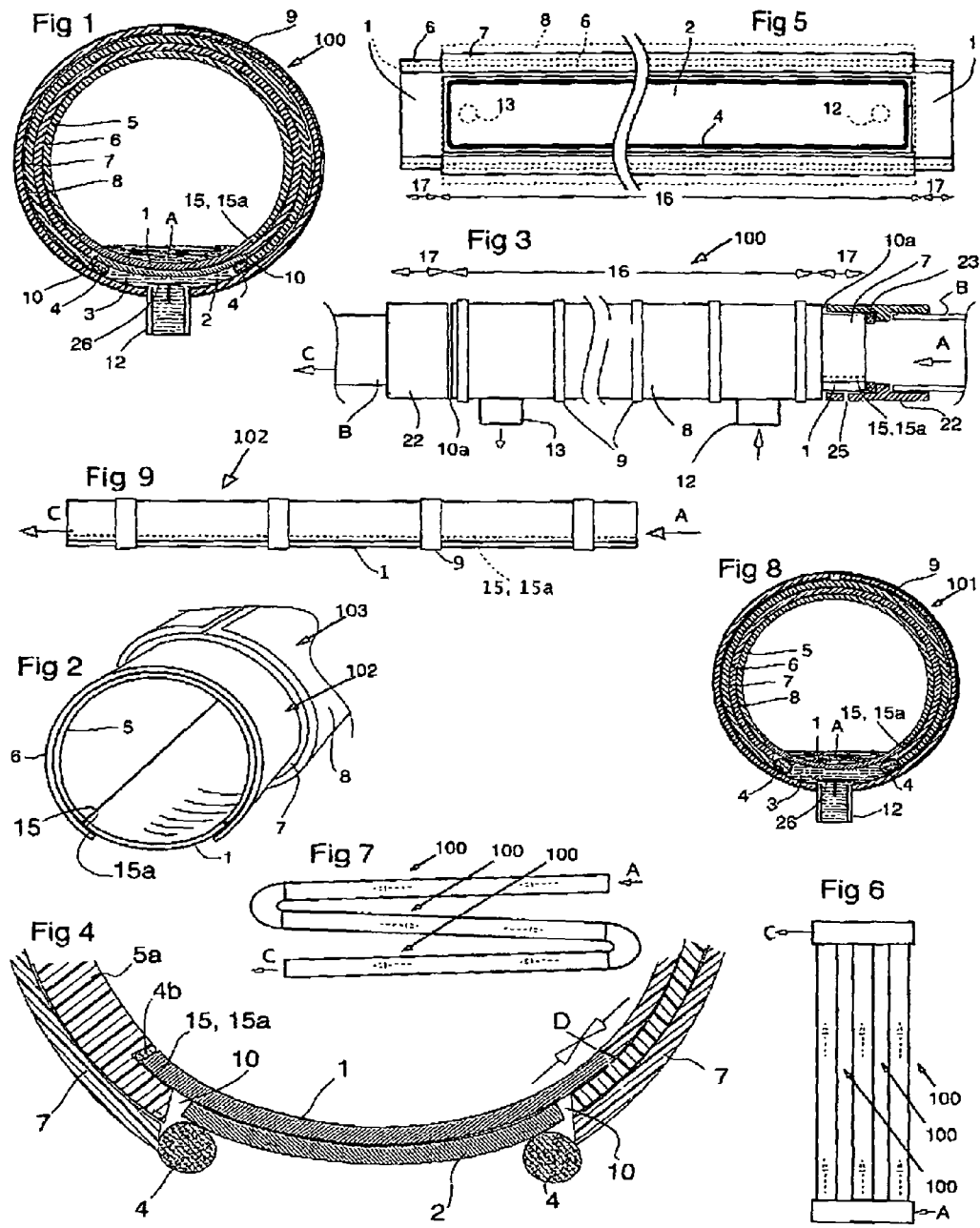

COMPOSITE PIPE HEAT EXCHANGER FOR DRAINWATER HEAT RECOVERY

FIELD OF THE INVENTION

The present invention is in the field of heat exchangers and more particularly drainpipe heat exchangers for drainwater heat recovery from horizontal drainpipes.

BACKGROUND OF THE INVENTION

Drainwater is a low-level heat source. As such it requires a low cost heat exchanger in order that home and building owners can recover its cost in a reasonable time.

SUMMARY OF THE INVENTION

In a first embodiment the hybrid heat exchanger is used to transfer drainwater heat to the surrounding air. The hybrid tube comprises two or more tube segments, a tube segment being a straight, rigid tube of some suitable diameter with a wide open gap along its length, that is, a tube missing a full length longitudinal strip. This gap of course can be of any width such that the resulting tube segment has a lesser or greater circumference. For the purposes of this disclosure the term "tube segment or tube segments" will be used to refer to: a concave strip; an open-gap tube segment; a semi-cylinder; a horizontal cylindrical segment.

In its simplest form the hybrid heat exchanger has a first lower tube segment and a second upper tube segment. The two tube segments are joined together to form a complete tube or cylinder.

The lower, elongate tube segment is for heat transfer and is preferably made from a strip of sheet copper, formed to a specific diameter. Uniquely, this tube segment can be kept as short as needed to match the depth of flowing drainwater. Minimizing the copper requirement in this way, reduces cost without affecting performance.

The upper, elongate tube segment is of approximately the same diameter and length. It is preferably made from plastic and is has a thicker wall than the lower (copper) such that parallel ledges are created along the joint extending outwards radially from the copper. The plastic segment may be custom extruded so as to have the required internal marginal recesses to receive the copper, or, it may be assembled from multiple plastic tube segments arranged concentrically and having appropriate gap widths to thereby create the required internal marginal recesses. In either design, the lower tube segment seals into the internal marginal recesses of the upper tube segment(s) thereby creating a sealed tube or pipe having a substantial portion of the copper exposed below.

In the first embodiment of the instant heat exchanger the marginal ends of this hybrid tube are connected to the drainage system leaving the majority central portion for heat transfer. When the temperature of flowing drainwater is different from the surrounding ambient air, heat transfers therewith by conduction through the copper.

In a second embodiment of the instant heat exchanger, the hybrid tube includes a cold water chamber adjacent the exterior of the exposed copper tube segment. This may be accomplished by means of a custom extruded plastic tube having the necessary varying wall thicknesses, recesses and shaped connection ends. Or, simply, a second plastic tube segment of larger diameter (or stretched-spread larger) may be fitted concentrically with the hybrid tube. This second segment is shorter in length so that the ends of the hybrid tube remain exposed for connection to the drainage system.

the second plastic segment has water fittings near each end. These fittings are through the continuous bottom wall of this third plastic tube segment, whereas its gap is opposite and uppermost. The upper segments may be glued together and may use spaced external clamps that tighten around the complete assembly.

Between the hybrid tube and the third plastic tube segment component is an elongate peripheral gasket of suitable thickness such that a chamber is defined therebetween. The gasket only seals around the central, heat transfer portion of the exposed copper tube segment, leaving end portions available connection as before. The gasket also encloses the water fittings. The gasket thus forms the wall of an elongate chamber such that when the external clamps are tightened, the gasket compresses so that pressurized cold water can flow via the fittings through the chamber adjacent the copper and transfer heat therewith. An auxiliary outer tube segment of steel may be used under the clamps to add strength. The water is directed to a faucet or water heater.

The third embodiment is very similar to the second but further includes a second elongate copper tube segment positioned between the gasket and the first copper tube segment. The gasket's compression and the internal water pressure in the chamber forces the two copper tube segments tightly together to maximize the rate of heat transfer. The second copper tube segment is narrower (and shorter) so that open paths are created along its edges. These paths are vents to the ambient so that in the event of failure, liquid leakage will visibly accumulate on the floor beneath the heat exchanger.

In the second and third embodiments yet another plastic tube segment can be introduced as a spacer between the hybrid tube and the third (outer) tube segment. Its purpose is to enable the exterior clamps to be heavily tightened so as to resist water pressure effects yet not over-compress the gasket. This tube segment can also serve to locate the gasket during assembly of the heat exchanger, and to affect the volume of the chamber by permitting a change in gasket thickness while holding the required compression under highly tightened clamps.

All embodiments are preferably made as long and as large a diameter as is convenient to maximize surface area for heat transfer which directly influences cost-effectiveness.

In the second and third embodiments copper tube segment may be formed with dimples or ridges to create turbulent flow which increases the rate of heat transfer. In the third embodiment, the two concave copper strips may be co-formed with such features are mirrored so as to maintain full thermal contact therebetween.

In certain plumbing installations it may be that using multiple hybrid drainpipe heat exchangers is preferable to a single long one. For example several shorter units (which may be of a standardized length) can be plumbed together in an end-to-end arrangement, or several may operate in parallel where a portion of the drainwater flows through each branch, or several may be arranged in a zig-zag fashion against a vertical wall in place of a vertical heat exchanger thereby offering more heat transfer surface area for higher performance.

While it may be used in a variety of heat transfer applications, instant heat exchanger's use in heat recovery from a building's wastewater drainpipe will be described in detail herein. The instant heat exchanger is suitable for both vertical and horizontal installations.

When installed vertically it operates as a falling film heat exchanger where the drainwater flows circumferentially on the inner wall which maximizes the wetter surface area needed for heat transfer. Typically, vertical installations are limited in length by ceiling-to-floor dimensions in buildings which, in turn, limits the wetted surface area.

By moving the relative locations of its plumbing fittings, it can be used horizontally, where it is preferably made as long as possible to maximize wetted surface area for heat transfer which directly affects performance and cost-effectiveness.

The heat exchanger comprises a set of concentric cylindrical components. At the center is a conduit such as a standard drainpipe made of copper or other thermally conductive material.

Around it is a shorter cylinder of sheet copper (or other thermally conductive material). This cylinder is open along its length to define a small gap. Concentric with the cylinder and spaced from it (i.e., of larger diameter) is a outer tube of plastic or other rigid, low-cost material, which has a ring of spaced holes that are covered by a manifold at each end.

Next is a unique gasket-spacer, such as a common O-ring, that follows the perimeter of the copper cylinder and thereby defines the boundary of a sealed chamber one wall of which is the cylinder and the other the plastic tube. The inner openings of the ring of holes are also enclosed by the gasket.

The short cylindrical plastic manifolds are sealed to the outside of the plastic tube and have has an internal circumferential groove and a water fitting. The fitting opens into the groove within which the outer openings of the ring of hole are located.

Thus water (or other fluid) for heat transfer with the central drainpipe, enters the sealed chamber at one end and exits at the opposite end of the outer tube.

Heat transfer takes place in the chamber, either heating or cooling, depending on the relative temperatures of the drainwater and the fresh water. For most uses heating of the freshwater will be the goal. However, for example, a drinking fountain can use the instant invention to cool the delivered water using draining cold water to cool fresh incoming warmer water.

The diametric dimensions of the components ensures that upon final assembly of the components, the first described drainpipe, which is inserted last, is a press fit into the cylinder which causes the O-ring to compress sealing the chamber.

Inside the chamber, the building's normal water pressure exerts enormous force on the cylinder close the gap slightly to create an extremely tight clamping action around the drainpipe for maximum thermal conductivity. For example with water pressure of 50 psi and a cylinder area of 200 square inches, the circumferential clamping force onto the drainpipe is 10,000 pounds.

BRIEF DESCRIPTION OF THE DRAWINGS

FIG. 1 is a cross-section of the double-walled third embodiment showing the concentric arrangement of the various tube segments;

FIG. 2 shows the two-tube segment are concentrically arranged and how the gap is bridged by the copper tube segment forming a hybrid tube of the first embodiment. Also shown are the next two concentric tube segments which are part of the second and third embodiments and where they are shorter leaving the hybrid tube end portion free for connecting to a building's drainage system;

FIG. 3 shows a longitudinal view where the end portions have end connections, and how a series of exterior band clamps are arranged;

FIG. 4 shows a close-up of part of FIG. 1 (minus the outer plastic tube segment) detailing how the copper, heat transfer tube segment is held by the recesses created by two concentric, open-gap plastic tube segments (on the right), or by use of a single custom-formed tube segment (on the left). Also shown is the vent path, and how an O-ring gasket is placed, and how the clamping forces cause tube segment compression at the recesses;

FIG. 5 shows a partial phantom bottom view with the peripheral gasket against the second copper tube segment. The outer plastic tube segment is shown in dotted outline;

FIG. 6 shows a top view of how several hybrid tube drainpipe heat exchangers can be manifolded together in parallel, each taking part of the drainwater flow which can increase performance in a short space;

FIG. 7 shows a side view of a zig-zag series flow arrangement using multiple units as might be arranged on a wall, for example where there is sufficient vertical drop;

FIG. 8 shows the second embodiment of a single wall heat exchanger having only one copper tube segment between the unpressurized drainwater and the pressurized fresh water; and FIG. 9 shows a side view of the hybrid tube heat exchanger to be used for liquid-to-air heat exchange.

DETAILED DESCRIPTION OF THE INVENTION

Referring to the drawings, there are small gaps or spaces showing between some components in some figures. This is for clarity. Most components are tightly fitted and sealed to prevent leaks. Also, although shown dead horizontal, in use they would be installed at a slight downward angle to provide self drainage.

The first embodiment is shown in perspective in FIG. 2 and in side view in FIG. 9. It comprises two or three tube segments. A tube segment is herein defined as a cylinder, tube or pipe that is missing a longitudinal portion of its wall so as to have an open gap. FIG. 2 shows one end of a three tube segment hybrid tube 102 comprising two concentric plastic tube segments and a heat transfer tube segment in, say, copper. The left side of FIG. 4 shows how a two tube segment hybrid tube is constructed from a custom, purpose-extruded tube segment 5a.

Tube segment 1 is largely used for heat transfer but has marginal portions 15a are for sealing. Internal tube segment 5 and tube segment 6 are engaged concentrically. Tube segment 5 has a wider gap and tube segment 6 a narrower gap. This creates recesses 15 into which marginal portions 15a of tube segment 1 locate and seal. Tube segment 1 therefore bridges the gap of second tube segment 6 creating a complete leak-proof tube 102 which is of one tubular diameter along its entire length. A linear gasket 4b may be used to augment sealing properties. Of importance in the design of the instant hybrid tube is the considerable compression that can be created in the recess 15 with tube segment 1, as shown as D in FIG. 4, if an interference fit is used such that tube segments 5, 6 are at least slightly spread apart by the insertion of tube segment 1. This compression D and resulting sealing effect can be further augmented by outside band clamps 9.

When in use, hybrid tube 102 has drainwater A inside and air outside. Thermal tube segment 1 (i.e., copper) conducts heat therebetween. If used for heat recovery, the outside ambient air is heated and moves by convection thereby providing drainwater heat recovery at low cost during, say, winter months (space heating months) to lower space heating costs. Obviously longer lengths of hybrid tube 102 will provide more heat recovery.

Embodiments two and three of the instant heat exchanger are for drainwater-to-water heat transfer and as such they have a pressurized water chamber through which a supply of cold water flows to be heated (or cooled).

Embodiment two 101 and embodiment three 100 each require, in addition to a hybrid tube 102, an enclosure 103 comprising two shorter tube segments: third plastic tube segment 7 and forth plastic tube segment 8. In FIG. 2 these two additional tube segments are shown rearward to the open end of hybrid tube 102 and concentric therewith. Tube segment 7 is a spacer and tube segment 8 is the outer tube segment that seals a water chamber against tube segment 1.

Second embodiment 101 is a single-wall-of-separation design and is shown in cross section in FIG. 8, where a single heat transfer tube segment 1 is used to transfer heat between drainwater and potable water. It may have dimples or ridges and the like formed thereon to create turbulence.

Third embodiment 100 is a double-wall-of-separation design identical to the second embodiment but further including a second tube segment 2 which is smaller in area (narrower and shorter) and lies adjacent the first tube segment 1 between recesses 15. A small space along the longitudinal edges of this tube segment 2 provide a vent 10 or air filled path to the ambient. In the event of a failure liquid can pass along the vent 10 a drip visibly to the floor beneath. Vent 10 may also be additionally formed by gasket 4 that leaves a small space that it is unable to be squeezed into (FIG. 4). Tube segment 1 and 2 are thermally conductive and as such are preferably made from a strip of sheet copper and formed into a concave shape herein referred to as a tube segment. They may also be further co-formed to have dimples, ridges and the like to create desirable turbulent liquid flow and remain in intimate thermal contact.

In second embodiment 101 and third embodiment 100 the water chamber is created from cooperating components rather than being a distinct article. The description that follows applies to both embodiments 101 and 100.

The internal volume of water chamber 3 is defined by a perimeter gasket 4 of elastomeric material of some appropriate thickness and in FIG. 4 is shown to be an O-ring. Gasket 4 seals against tube segment 1 or tube segment 2 if present. Gasket 4 also seals against the inner wall of tube segment 8 which therefore must resist water pressure. It may be aided in this later function by an external tube segment of sheet steel, for example (not shown). Gasket 4 is protected from over compression (and resulting water volume reduction) by tube segment 7. Gasket 4 is compressed in place by outer clamping elements 9.

Tube segment 8 has its gap on top and water fittings 12, 13 below, the water fittings communicating with the water chamber. The gap allows for diametric reduction from clamps 9. The water fitting 12, 13 connect between a water supply and a water use, such as a water heater or a faucet. Inlet fitting 12 may have an erosion plate 26 to prevent hard-water particles from eroding tube segments 1 or 2 prematurely. It would rest against concave strip 2 but is shown floating for clarity.

FIG. 2 shows how enclosing tube 103 comprises tube segments 7 and tube segment 8 which are both shorter in length than hybrid tube 102 so as to only enclose heat exchanger portion 16 (FIG. 3) and leave end portions 17 exposed and of a minimum diameter to receive hubs 22 for connection to standard drainage plumbing B. FIG. 4 also shows that third tube segment 7 may have bevelled gap edges to help retain gasket 4 during assembly.

In use a first liquid, drainwater A (shown with entrained solids), flows on tube segment 1 which is thereby heated if drainwater A is warmer. The cooled drainwater C leads to a sewer connection (not shown). The second liquid enters chamber 3 via inlet fitting 12, flows against tube segment 1 or tube segment 2, transfers heat therewith, and leaves via outlet fitting 13 to the intended final use.

In all embodiments, the tube segments may be made of any suitable material. Tube segments 1 and 2 being used for heat transfer may be made of copper or stainless steel for example. Tube segments 5, 6, 7, 8 are not for heat transfer and so may be of a low-cost material such as galvanized or painted steel, but preferably are made from water-safe plastic such as PVC or ABS and the like.

All embodiments have some form of connector or are able to connect in a leak-proof manner to the drainage tubes or pipes in the building where they are installed. There will be some small unavoidable cracks and crevices present at the connection end due to different thickness and rates of thermal expansion. To seal the ends perfectly from septic drainwater leakage the following hubs are described.

In FIG. 3 hubs 22 have seals 23, preferably square-section O-rings, and holes 25 (one shown on right). Holes 25 are for an adhesive to be injected at final assembly to encase ends 17. The hubs 22 do not seal on their inner ends. A small gap 10a allows for any leakage from vent 10 to continue through to the ambient.

Using as an example heat recovery from, say, a shower or sink, upon opening a faucet (valve) hot water flows out in reaction to pressurized cold water flowing into the water heater. The resulting drainwater flows down the drain and through the instant hybrid horizontal drainpipe heat exchanger. The pressurized fresh cold water however, first flows through the heat exchanger where its temperature is raised by the heat of the drainwater. This allows the water heater to reach 'hot' temperature faster increasing the useable hot water supply while less energy which saves money.

In certain plumbing installations it may be that using multiple heat exchangers is preferable. For example several shorter units can be joined end-to-end; several may operate in parallel (FIG. 6) where a portion of the drainwater flows through each branch; or arranged in a zig-zag fashion (FIG. 7) against a vertical wall in place of a vertical heat exchanger thereby offering more heat transfer surface area.

A common water pressure regulator (not shown) can be used to control too-high pressures.

Although the invention has been shown and described with respect to detailed embodiments thereof, it should be understood by those skilled in the art that various changes in form and detail thereof may be made without departing from the spirit and the scope of the claimed invention.

I claim:

1. A heat exchanger for connection inline with a generally horizontal oriented drainage system through which drainwater flows, and for connection between a fluid supply and a device that benefits from the fluid being at a different temperature, comprising:
 a first conduit for the drainwater comprising:
  upper and lower longitudinally extending arcuate segments sealedly joined along their respective longitudinal edges so as to thereby create a drainpipe; and where the lower arcuate segment is thermally conductive;
  the lower arcuate segment having a concave inner surface and a convex outer surface and a radius of curvature;
 a second conduit for the fluid supply comprising:

a gasket in sealing engagement with the convex outer surface;

the gasket enclosing a major portion of the convex outer surface and defining a longitudinally extending arcuate space thereon;

an outer sleeve having inner and outer walls and a longitudinal extending opening;

the outer sleeve having end portions, each end portion having an aperture in fluid communication with the arcuate space and where a first aperture has an inlet fitting for connection to the fluid supply and a second aperture has a fitting for connection to the device;

the inner wall of the outer sleeve in sealing engagement with the gasket thereby creating a longitudinally extending arcuate conduit bounded by the inner wall, the gasket and the convex outer surface;

clamp means external to the outer sleeve to maintain sealing engagement of the gasket, the inner wall and the convex outer surface;

the arrangement being that the drainwater flowing through the drainpipe and the fluid flowing through the arcuate conduit will exchange heat.

2. The heat exchanger of claim 1 further including:

a longitudinally extending, thermally conductive arcuate sheet between the gasket and the convex outer surface, the arcuate sheet having a radius of curvature substantially equal to the radius of curvature of the lower arcuate segment; the arcuate sheet having a convex outer face and a concave inner face; and where the concave inner face is in uniform thermal contact conductance with the convex outer surface of the lower arcuate segment of the first conduit;

the convex outer face having a peripheral marginal portion;

the gasket sealingly engaging the peripheral margin portion thereby enclosing the longitudinally extending arcuate space on the convex outer face; and where the inner wall of the outer sleeve is in sealing engagement with the gasket thereby creating the longitudinally extending arcuate conduit bounded by the inner wall, the gasket and the convex outer face.

3. The heat exchanger of claim 1 where the upper arcuate segment comprises two or more layered segments arranged to provide a recess along each of the longitudinal edges of the upper arcuate segment to engage the respective longitudinal edges of the lower arcuate segment.

4. The heat exchanger of claim 1 where the lower arcuate segment is copper.

5. The heat exchanger of claim 2 where the thermally conductive arcuate sheet is copper.

6. The heat exchanger of claim 1 or 2 where the gasket is an O-ring.

* * * * *